(12) United States Patent
Masry

(10) Patent No.: US 9,390,556 B2
(45) Date of Patent: Jul. 12, 2016

(54) SYSTEMS AND METHODS FOR GENERATING A LARGE SCALE POLYGONAL MESH

(71) Applicant: UNIVERSAL SYSTEMS, LTD., Fredericton (CA)

(72) Inventor: Mark Masry, Fredericton (CA)

(73) Assignee: TELEDYNE CARIS, INC., Thousand Oaks, CA (US)

( * ) Notice: Subject to any disclaimer, the term of this patent is extended or adjusted under 35 U.S.C. 154(b) by 166 days.

(21) Appl. No.: 14/212,580

(22) Filed: Mar. 14, 2014

(65) Prior Publication Data

US 2014/0267262 A1 Sep. 18, 2014

Related U.S. Application Data

(60) Provisional application No. 61/794,140, filed on Mar. 15, 2013.

(51) Int. Cl.
*G06T 17/20* (2006.01)

(52) U.S. Cl.
CPC ...................... *G06T 17/20* (2013.01)

(58) Field of Classification Search
CPC ....................................................... G06T 17/20
See application file for complete search history.

(56) References Cited

U.S. PATENT DOCUMENTS

| | | | |
|---|---|---|---|
| 5,966,133 A | 10/1999 | Hoppe | |
| 6,208,347 B1 | 3/2001 | Migdal et al. | |
| 6,262,739 B1 | 7/2001 | Migdal et al. | |
| 6,271,856 B1 | 8/2001 | Krishnamurthy | |
| 6,611,267 B2 | 8/2003 | Migdal et al. | |
| 6,677,942 B1 | 1/2004 | Rushmeier et al. | |
| 6,867,774 B1 | 3/2005 | Halmshaw et al. | |
| 7,262,713 B1 * | 8/2007 | Vogl et al. | 340/970 |
| 7,804,498 B1 * | 9/2010 | Graham et al. | 345/419 |
| 8,274,530 B2 | 9/2012 | Birtwistle et al. | |
| 8,290,305 B2 | 10/2012 | Minear et al. | |
| 8,525,848 B2 | 9/2013 | Janson | |
| 8,654,121 B1 | 2/2014 | Yu et al. | |
| 2005/0116950 A1 * | 6/2005 | Hoppe | 345/423 |
| 2010/0049477 A1 * | 2/2010 | Sivan | 703/1 |
| 2011/0316854 A1 | 12/2011 | Vandrovec | |
| 2013/0222385 A1 | 8/2013 | Dorsey et al. | |

(Continued)

OTHER PUBLICATIONS

Agarwal, et al., From Point Cloud to Grid DEM: A Scalable Approach, Springer-Verlag, 2006, Proc. 12$^{th}$ International Symposium on Spatial Data Handling, pp. 771-788.*

(Continued)

*Primary Examiner* — Maurice L McDowell, Jr.
(74) *Attorney, Agent, or Firm* — Preti Flaherty Beliveau & Pachios LLP

(57) ABSTRACT

A polygonal mesh is generated from a collection of points that are organized for a mesh partition in accordance with a tile that includes one or more bins used to process the points that define the mesh. The resolution of the tile is related to the number of bins for the tile. The organization of the tiles in a partition of the mesh permits the mesh to be constructed with partitions that are independent of each other and that can be joined to form a continuous mesh. The resolution of the mesh can be dynamic with respect to the partitions due to the variable resolution assigned to each tile. Portions of the mesh for which points are not provided can be assigned finalization points to permit a continuous mesh to be constructed.

21 Claims, 6 Drawing Sheets

(56) References Cited

U.S. PATENT DOCUMENTS

2013/0249909 A1* 9/2013 Thompson et al. ........... 345/420
2013/0321401 A1 12/2013 Piemonte et al.

OTHER PUBLICATIONS

Frey, et al., Fast Adaptive Quadtree Mesh Generation, Oct. 26-28, 1998, INRIA, Proc. $7^{th}$ International Meshing Roundtable, Sandia National Lab, pp. 211-224.*

Gao, et al., Visually-Complete Aerial LiDAR Point Cloud Rendering, Nov. 6-9, 2012, ACM, ACM SIGSPATIAL GIS '12, pp. 289-298.*

Gobbetti, et al., Layered point clouds: a simple and efficient multiresolution structure for distributing and rendering gigantic point-sampled models, 2004, Elsevier Ltd., Computers & Graphics 28, pp. 815-826.*

Pajarola, Overview of Quadtree-based Terrain Triangulation and Visualization, Jan. 2002, Computer Graphics Lab Information & Computer Science Department University of California Irvine, pp. 1-16.*

Zou, et. al., Multi-resolution Hierarchical Point Cloud Segmenting, 2007, IEEE Second International Multisymposium on Computer and Computational Sciences, pp. 137-143.*

Andre Maximo, et al., "Adaptive Multi-Chart and Multiresolution Mesh Representation", Computers & Graphics 38 (2014) 332-340.

M. Wand, et al., "Multi-Resolution Rendering of Complex Animated Scenes", Eurographics 2002, vol. 21., (2002), No. 3.

W. Sun, et al., "Cloud Data Modelling Employing a Unified, Non-Redundant Triangular Mesh", Computer-Aided Design 33 (2001) 183-193.

R.B. Rusu, et al., "Towards 3D Point Cloud Based Object Maps for Houshold Environments", Robotics and Autonomous Systems 56 (2008) 927-941.

* cited by examiner

SYSTEMS AND METHODS FOR GENERATING A LARGE SCALE POLYGONAL MESH

STATEMENT REGARDING FEDERALLY SPONSORED RESEARCH OR DEVELOPMENT (Not Applicable)

BACKGROUND OF THE INVENTION

The present disclosure is related generally to generation of a polygonal mesh, and related more specifically to large scale polygonal meshes that can be generated as piecewise partitions.

Measurements taken with respect to natural phenomena often generate a significant number of data points that can sometimes be analyzed as a polygonal mesh. Typically, the data points are obtained in the form of a point cloud, which is a set of points in two dimensional or three dimensional space. The data point in the point cloud can be regularly spaced, or irregular in their spacing, and can be arbitrary in number. For example, the number of data points in a point cloud is not particularly limited, nor are there any typical constraints on the density of the data points in any given region of the point cloud. A point cloud may typically include several billion data points, for example, which can be generated by an arbitrary sensor system, such as by recording measurement samples of a given surface or shape.

Given a particular point cloud, a polygonal mesh can be generated that defines a number of polygonal shapes connecting the points. The points are typically stored in a computer memory for creation of the mesh, and are representative of specific locations in a space that is defined on one or more dimensions. Accordingly, the points represent information about characteristics of the space, and can therefore be used to define a mesh for the space.

Mesh generation algorithms have been used to connect points in a given space to obtain a mesh that can be useful for analysis of the characteristics of the space in relation to the points. However, conventional mesh generation algorithms tend to be limited in the number of points that can be practically processed to generate a mesh, since the algorithms work on all the available points or polygonal shapes generated from the points to generate a mesh. It is impractical to employ such algorithms on large data sets that have relatively large numbers of points.

BRIEF SUMMARY OF THE INVENTION

A polygon mesh is a collection of vertices ("points") and connecting edges that define polygonal shapes. The most common type of polygonal mesh used in Geographic Information Systems ("GIS") is a Triangulated Mesh (the term "mesh" refers herein to a triangulated mesh). Most mesh generation algorithms require all of the points over which the mesh is constructed to be in system memory; this is a prohibitive limitation for large datasets. In accordance with the present disclosure, a new mesh construction technique that can work on very large collections of irregular points is presented. This technique can also be used to produce a mesh with multiple levels of resolution, making it suitable for interactive visualization.

The present disclosure is applicable to point clouds that include an arbitrary number of points, with no limitation on the density of the points in any given region of the point cloud. The present disclosure also is applicable to point clouds that are composed of regularly and/or irregularly spaced data points. Moreover, the systems and methods of the present disclosure are applicable for use with 2D and 3D polygonal meshes, with the exemplary embodiments described herein being understood to be applicable to either 2D or 3D polygonal meshes.

In accordance with an aspect of the present disclosure, the points are first analyzed to produce a hierarchical "resolution map" consisting of a set of "tiles," each of which has a resolution value that models the approximate density of the points in the underlying region of space. The resolution value is used to construct a regular "binning grid" that sits within each tile. The points themselves are processed, such as by being indexed, and stored in a hierarchical data structure that allows efficient point retrieval. The mesh can be implemented as a number of partitions, each of which represent a subsection of the mesh. Each mesh partition is constructed dynamically by loading in all points within the partition area, and all of the points within a window around the partition area. As the points are loaded, they are "binned": mapped onto the bins in the binning grid. If a bin does not contain any points, the mesh generation algorithm inserts a special point ("a finalization point") within the empty bin. The finalization points can contribute to avoiding holes or gaps in the mesh constructed in a partition.

The binning process and the accompanying insertion of finalization points into the mesh constrain the partition so that its intersection with neighbouring partitions is unique and limited in size. The union of all partitions forms a single, continuous mesh.

BRIEF DESCRIPTION OF THE SEVERAL VIEWS OF THE DRAWINGS

The present disclosure is described in greater detailed below, with reference to the accompanying drawings, in which.

DETAILED DESCRIPTION OF THE INVENTION

According to an exemplary embodiment of the present disclosure, a partitioned mesh is provided, which is a triangulated mesh over a set of points making up a point cloud in a region of space that is subdivided into subsections or partitions. The mesh is constructed in such a way that each partition can be triangulated independently of the others. The union of the set of partitioned meshes is defined as being equal to the entire mesh, and the union of the set of triangulated partitions forms a single, contiguous, non-self-intersecting mesh that covers the entire area represented by the point cloud without gaps. The independently triangulated partitions implies that the entirety of points of the mesh need not be in memory at the same time, and that partitions can be triangulated in parallel.

Conceptually, partitioned meshes can be built over many kinds of data:

Regular rasters (points lie on a regular grid)
Quasi-regular rasters (points lie explicitly on a regular grid whose inter-node spacing varies in different areas)
Collections of irregular points.

The number of partitions is a function of the underlying data and the technique by which the mesh is constructed. There need not necessarily be more than a single partition.

Many algorithms (e.g contouring, volume computations and linear interpolation) originally designed for in-memory triangulations can be refactored to operate on partitioned meshes, allowing them to address and operate on datasets that are, in total, larger than can fit into available memory. Volume computations can be performed on a triangulated quasi-regular raster of arbitrary size, for example.

In accordance with an exemplary embodiment of the present disclosure, the concept of a partitioned mesh is general and does not assume that the points in the mesh are regular, or even quasi-regular. Previous approaches for partitioned meshes have been limited to regular or quasi-regular points. The present disclosure provides a new type of partitioned mesh—the Variable Resolution Mesh—that does not have this restriction. According to some embodiments of the present disclosure, quasi-regularity is imposed as a weak constraint using an implicit model of the density of data in each area.

A variable resolution mesh is a type of partitioned mesh built on a set of points, using the assumption that the points in a given sub-area have an underlying density model. The mesh partitions are constructed dynamically, using a mesh generation algorithm that operates on a subset of the points, and a resolution map that models the approximate density of the points in different and distinct regions of space. The mesh generation algorithm operates in such a way that each partition's edges match up exactly with those of its neighbours, allowing the collection of partitions to form a continuous mesh over the entire collection of points.

Figure 1:
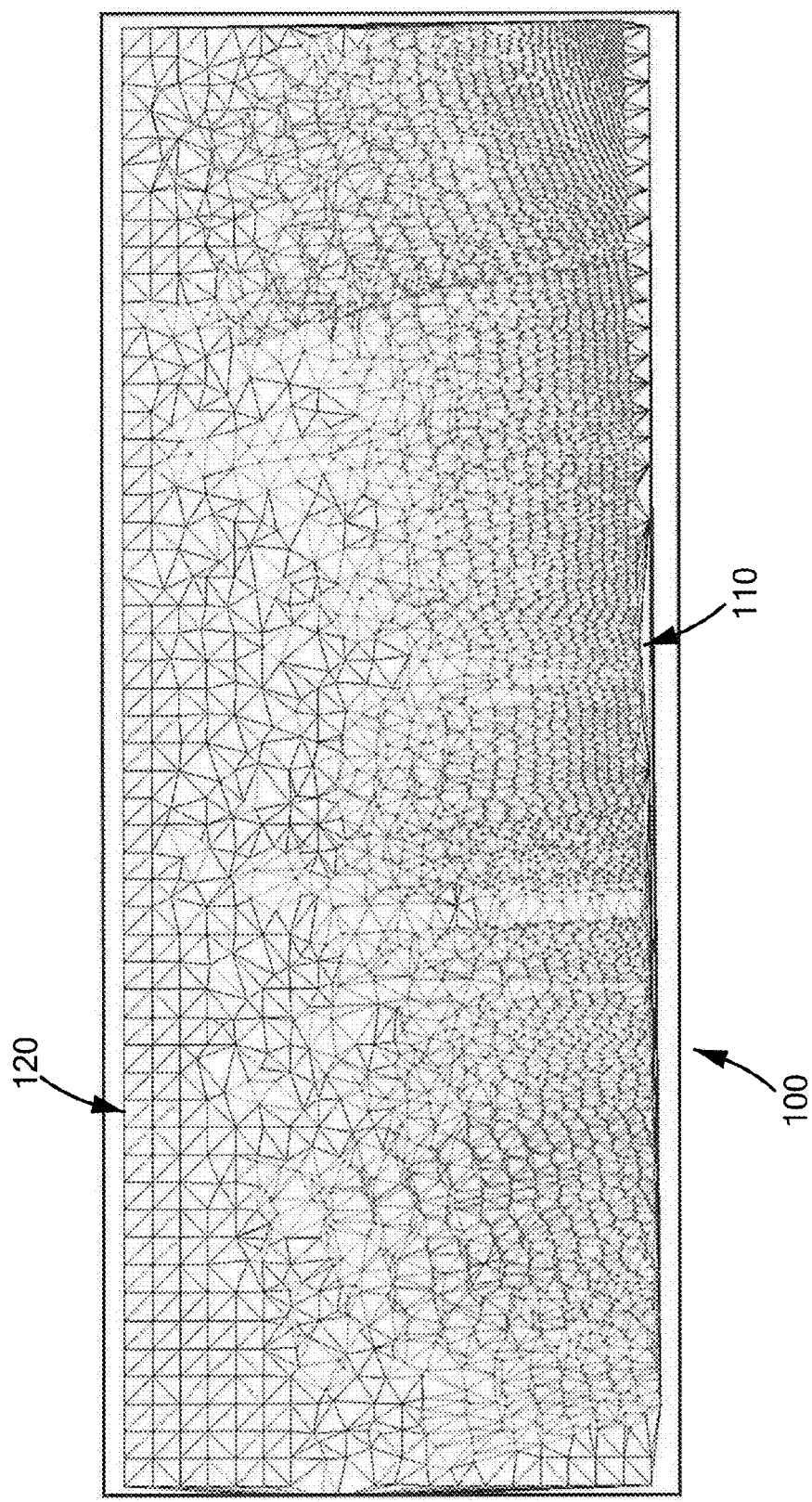
FIG. 1 is an example of a variable resolution mesh.

FIG. 1 illustrates an example of a variable resolution mesh 100, which is a triangular mesh. A region 110 illustrated valid data with non-uniformly sized triangular size shapes. A region 120 with uniform sized triangular shapes indicates areas for which no data is available, and for which finalization points have been provided to complete the mesh.

According to an exemplary embodiment of the present disclosure, a 2D triangular mesh is constructed. The points used to construct the mesh may have an arbitrary dimensionality. The mesh is constructed over the 2D (x,y) projections of the points onto a plane, which can be a horizontal plane, for example. The meshing algorithm can be generalized to more than two dimensions so the present example should not be considered limiting.

Figure 2:
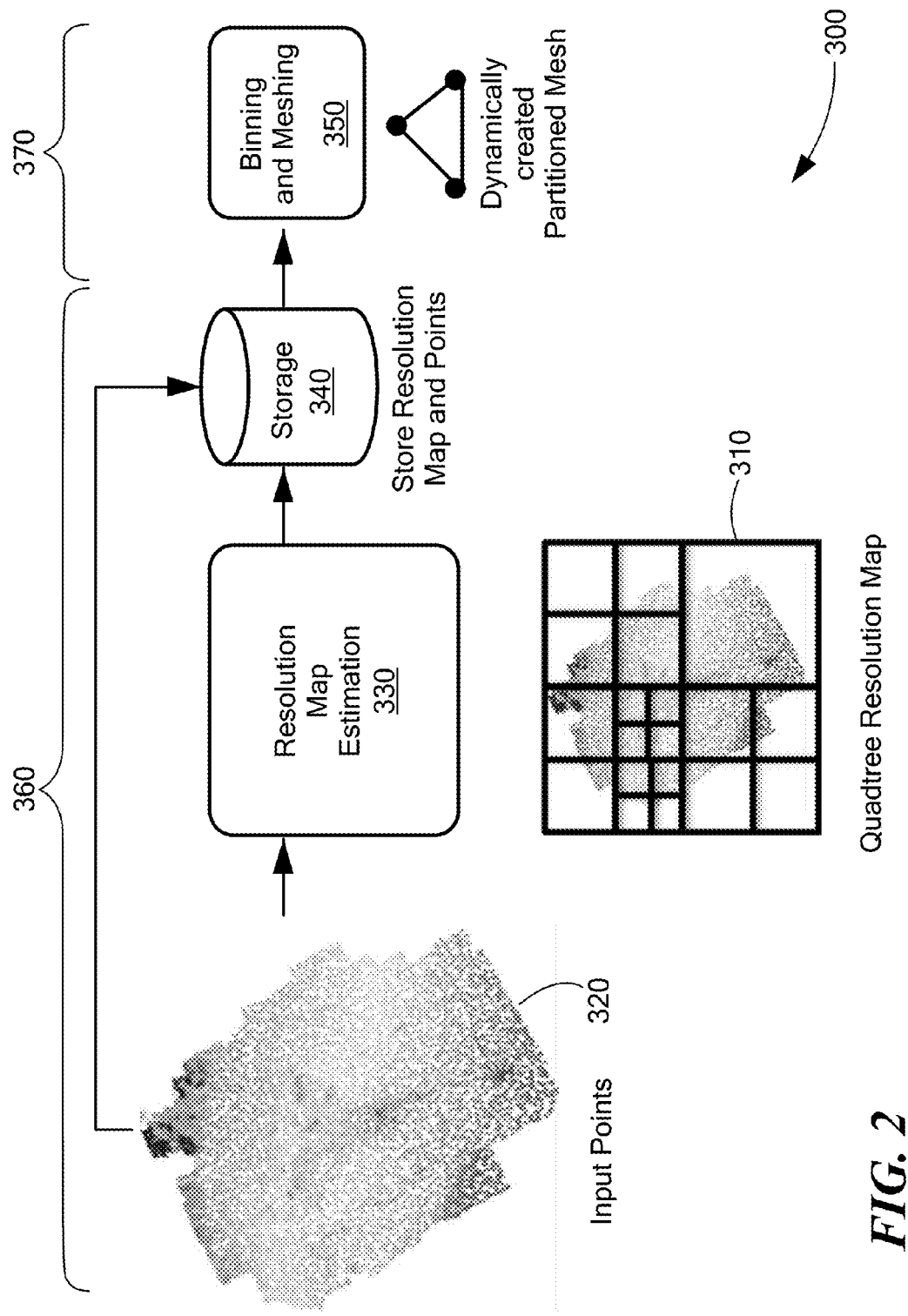
FIG. 2 is a diagram of a process flow for generating a mesh in accordance with an exemplary embodiment of the present disclosure.

Referring now to FIG. 2, a process 300 is shown that decomposes the overall area under consideration into a set of rectangular tiles organized in a quadtree. An example of the collection of rectangular tiles is graphically illustrated in FIG. 2 with a set of tiles, also referred to as a quadtree resolution map 310. Each tile in resolution map 310 is assigned a 2D resolution value, and the collection of tiles is referred to herein as the resolution map. The tile areas are contiguous, but not overlapping; each point is therefore subtended by one (and only one) of the tiles. The tile resolutions can take on any value, but are generally computed explicitly using a domain-specific construction algorithm that computes the resolutions in such a way that the mesh has specific properties. A specific example of resolution for a tile is one hundred meters in the horizontal X direction and 80 meters in the horizontal Y direction, however, the dimensions and units of the resolution is not to be considered to be so limited.

Accordingly, each of the tiles that make up resolution map 310 can have a different number of bins in the binning grid for each respective tile. The number of bins in each of the respective tiles is determined by the resolution for that tile, and vise-versa.

In accordance with embodiments of the present disclosure, a partitioned mesh is constructed in two stages referred to herein as an analysis stage and a meshing stage, illustrated in FIG. 2 as stages 360 and 370, respectively. Analysis stage 360 is described first.

Analysis Stage

In the analysis stage, the point cloud data is read from one or more files to determine the 2D area that contains all of the points in the cloud (the "cover"). The cover is then subdivided recursively to form a hierarchical "resolution map": a set of areas ("tiles"), the union of which is equal to the cover. Each point in the cloud therefore falls into exactly one tile, which can be viewed as a "leaf" in the hierarchy.

The term "partition" refers to a subsection of the entire mesh. Each partition corresponds to one, and only one, tile in the resolution map. A single mesh partition will be constructed for each tile, so there is a one-to-one relationship between the number of tiles and the number of mesh partitions.

A "resolution value" is then computed for each tile. The term "resolution" is usually taken to mean the distance between adjacent points in a regular grid. According to some embodiments of the present disclosure, the term defines the size of the cells in a "binning grid": a regular arrangement of contiguous, rectangular areas that cover the tile's area exactly. The number of bins in the binning grid is computed by dividing the tile's horizontal extents by its resolution value. The tile areas are contiguous, but not overlapping; each point in the cloud therefore lies in exactly one bin.

The resolution values can take on any value, but are generally computed explicitly from the point locations or the point attributes. The resolution values can be used to specify a binning grid during the meshing stage. According to some embodiments, the resolution map is constructed using a quadtree structure as follows:

1. Start with a single tile corresponding to the cloud's cover.
2. For each tile in the quadtree compute both the number of points falling into tile and a measure of the "resolution" of the points falling into the tile.
3. If the number of points in the tile exceed a fixed tolerance, or the resolution value falls outside a user-specified tolerance, split the tile into 4 children.
4. Repeat steps 2 and 3 until no further tiles are split.

In the example implementation, the resolution value for a given tile is computed by normalizing the number of points falling into the tile by the area of the tile to yield a measure of the density of the points in the tile. Note, however, that in other implementations the resolution value can be computed using other measures (e.g. the variance of the point attributes in an area). It is further not required that the binning cells be rectangular, other binning shapes can also be used provided that they are contiguous and non-overlapping. The resolution and the associated binning grid provide a simple a priori model of the distribution of points in each tile.

Following construction, the resolution map tiles and their resolution values are stored in a flat file. They are loaded into memory during the meshing stage. In addition, the points in the cloud and their attributes are processed to be reordered and/or indexed and stored in a storage media, such as on a storage disk, to facilitate efficient retrieval and/or queries. The points may be stored in one or more flat files, in one or more database files, e.g., organized into tables, and/or in linked lists or any other format that contributes to their organization and/or ease of retrieval or query. According to an exemplary embodiment, the points are organized by:

1. Grouping nearby subsets of the points together in contiguous blocks on storage media, such as a hard disk, according to their spatial position so that clusters of nearby points can be retrieved with a minimal number of read operations.
2. Constructing a spatial index over the points in each storage block so that the list of disk blocks whose points overlap a rectangular query area can be determined efficiently.

Storing the points according to such exemplary architectures contributes to high performance retrieval operations from the point storage media. FIG. 2 illustrates the above-described steps in analysis stage 360 as part of process 300 for building a variable resolution mesh over an existing set of points. An input dataset 320, representing a point cloud, is applied to resolution map estimation 330 to build resolution map 310. In the example shown in process 300, resolution map 310 is a quadtree resolution map, however, other types of resolution maps can be implemented in accordance with embodiments of the present disclosure. For example, an octree resolution map can be constructed for 3-D mesh generation. The points in the point cloud and resolution map 310 are stored in a storage 340 in preparation for a subsequent stage, such as binning and meshing process 350, which can be used to create mesh partitions on demand based on input data set 320.

Figure 3:
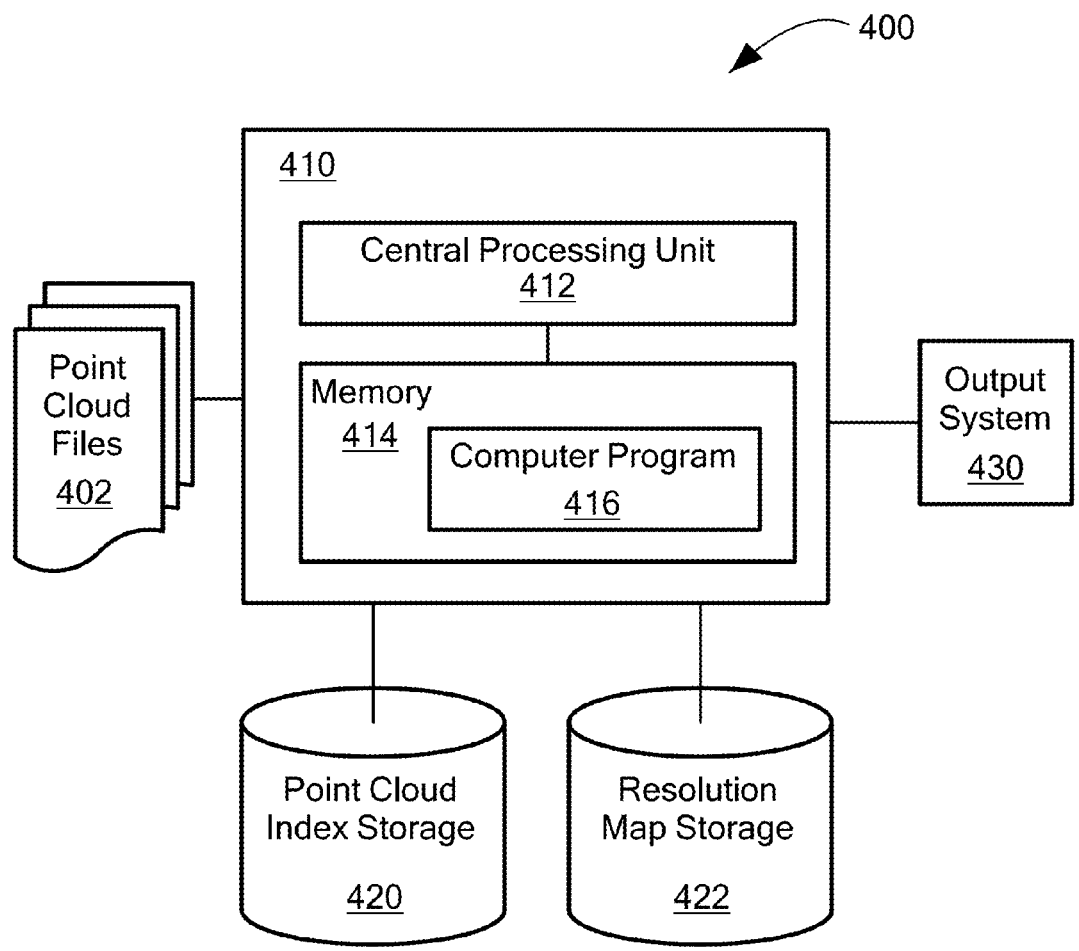
FIG. 3 is a block diagram illustrating a system for implementing exemplary embodiments of the present disclosure.

Referring now to FIG. 3, a block diagram of a system 400 illustrates an implementation of an exemplary embodiment according to the present disclosure. System 400 includes a numerical computation device 410, such as a computer, which can be implemented as a PC, minicomputer mainframe, or any other type of programmable computation device. Device 410 includes a CPU 412 for executing instructions to carry out processes according to embodiments of the present disclosure. A local memory 414 stores information that is readily accessible to CPU 412, including a program 416 that CPU 412 can execute to implement embodiments of the present disclosure. Typically, memory 414 is implemented as a type of RAM that is often optimized for reduced access times for read or write operations. The size of memory 414 is typically significantly less than that of long term, more permanent mass storage, and is thus sometimes unable to hold all the data points in a point cloud at the same time.

System 400 also includes point cloud files 402 as input to the system. Files 402 can include all the data points in a given point cloud, as well as attributes of the data points. It is these files 402 that are read to implement various embodiments of the present disclosure to generate a polygonal mesh. Once device 410 processes the data points in files 402 in accordance with some of the embodiments herein, the data points can be reordered and/or indexed for faster retrieval and simplified processing, as discussed above. The reordered and/or indexed data points are stored according to a desired storage scheme in mass storage 420.

The above described analysis stage generates a resolution map, which can be achieve using device 410 executing a suitable program 416. The resolution map is stored in mass storage 422 for later retrieval in the generation of a polygonal mesh according to the present disclosure. The resolution map can be retrieved from mass storage 422 by device 410 and processed to produce a partitioned polygonal mesh in accordance with exemplary embodiments of the present disclosure. The output partitioned polygonal mesh is illustrated as output system 430 in system 400.

Figure 4:
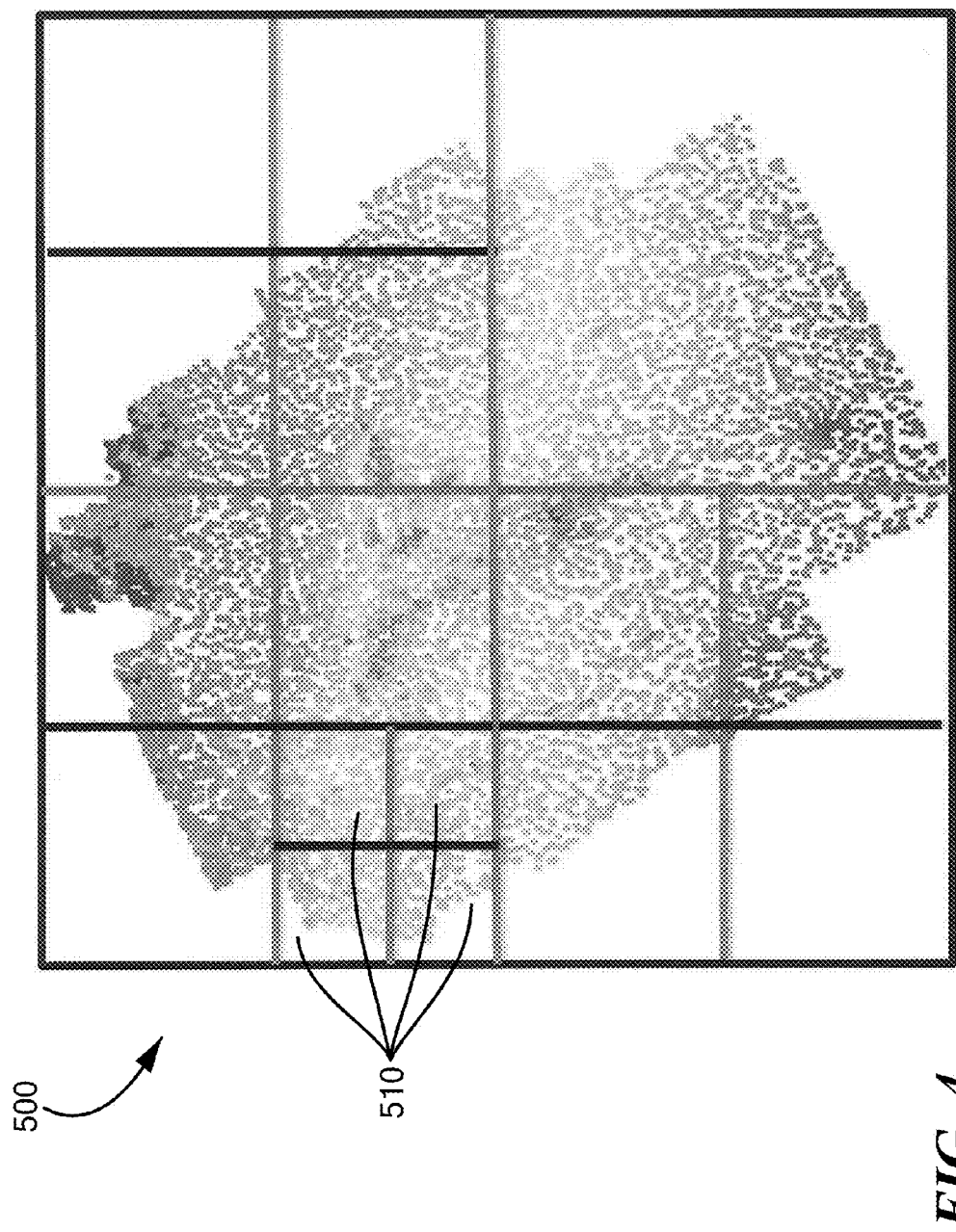
FIG. 4 is an illustration of tiles generated from a point cloud in accordance with an exemplary embodiment of the present disclosure.

Referring now to FIG. 4, a resolution map 500 is illustrated. Resolution map 500 is broken down or subdivided in a quadtree hierarchy, meaning that each subdivision produces four child tiles. Once the point cloud is subdivided according to user criteria, each tile is assigned a resolution value that can be used during a subsequent meshing stage to create a binning grid within the tile. According to an exemplary embodiment, a mesh partition is created for each resolution map tile. In the case of resolution map 500, sixteen partitions are created, one for each of the sixteen tiles, in accordance with this exemplary embodiment. It should be understood that a one-to-one correspondence of tiles to partitions is not required, and the present disclosure is not to be so limited. For example, partitions can be defined for the entire resolution map, or for any subdivision thereof, including rectangular or piece-wise partitions that are not square or rectangular, such as a partition that covers 75% of the resolution map. In general, any arbitrary grouping of tiles can be defined as a partition in accordance with the present disclosure.

Resolution map 500 has a group of tiles 510 that are the smallest tiles in the resolution map. Tiles 510 are located at the fourth level of the quadtree that describes resolution map 500. Due to the hierarchical structure of the tiles in the quadtree that define resolution map 500, tiles at specified levels of the quadtree can be independently or collectively retrieved. For example, all the tiles at levels one through three can be retrieved as a group and used to generate a polygonal mesh according to a certain resolution associated with level three of the quadtree.

The above-described analysis stage generates a number of tiles that represent, for example, the resolution and density of the point cloud in a hierarchical structure. The degree to which the resolution map is subdivided can be based on user settings with respect to a number of different criteria. For example, a user can specify an estimated resolution, such as two meters, or can specify an area, such as four square meters, or can specify a density, such as points/square meter, or any other criteria that can be used to determine how finely to subdivide the resolution map. The tiles of the resolution map are then iteratively determined by the above-described process where the content of a given tile is compared against the user specified criteria, or tolerance, to determine if the tile should be further subdivided. For example, if a tile is generated that has a number of data points that are closer than two meters, which is the resolution criteria, the tile will be subdivided and each resulting child tile is inspected to determine if the data points within that tile are within the resolution threshold criteria. Any tiles that do not meet the threshold criteria are further subdivided.

The resulting quadtree need not necessarily be balanced, since the distribution of data points need not be regular, and the attributes of the data points that are of interest may be unbalanced as well. Once the quadtree hierarchical structure is generated, and each tile in the quadtree is assigned a value associated with the subdivision criteria, the entire quadtree can be stored in memory so that each tile can be easily and individually retrieved. In addition, the quadtree can be stored as a hierarchical structure, so that a specific portion of the quadtree can be retrieved upon user request. For example, if a quadtree has seven levels of subdivision, a user may request only the tiles at levels one through three for use in generating a polygonal mesh. The tiles returned from such a quadtree query may represent a lower resolution, for example, resulting in coarser binning grids for those tiles. The division of the tiles in the quadtree structure provide implicit information related to the user specified criteria for processing the point cloud to generate a resolution map.

Meshing Stage

Sequential Delaunay Triangulation algorithms typically work by updating an existing mesh with a series of new points. The triangles in the mesh that interact with each new point are adjusted so that the new point becomes the vertex for one or more triangles. The set of triangles that interact with the point are those whose circumcircles (the circle passing through each of the triangle's three vertices) contain the point. When no new points intersect the circumcircle of a given triangle, the mesh will no longer change and can be considered stable.

The variable resolution meshing algorithm according to an exemplary embodiment of the present disclosure uses a standard Delaunay Triangulation algorithm, and supplements it by inserting points to constrain the size of all of the circumcircles in the mesh in such a way that parts of the mesh are forced into stability. The process is described in greater detail below.

As an initial phase of the meshing stage, user input is requested to define an area of the mesh that should be generated. According to one embodiment, the user inputs a rectangular area of interest (the "User Area") over which the mesh will be created is specified as an input to the meshing stage. The User Area is inspected to determine the partitions that define that portion of the mesh. With the User Area defined, the resolution map quadtree is queried to find all tiles that intersect with the User Area. The definitions of these intersecting tiles are then loaded from disk, for example, which may include loading the tiles from storage 422 (FIG. 3). The determination of which of the tiles in the quadtree are intersecting tiles can be conditioned on various criteria, such as tiles up to a certain level of the quadtree. The tiles that share a tile boundary with the intersecting tiles are also loaded. Then, for each of the loaded tiles, the pertinent points are retrieved, such as by consulting a spatial index used to store the points, and a mesh partition is constructed using a triangulation algorithm supplemented with a binning strategy. An exemplary embodiment is implemented as follows.

1. An empty mesh is initialized.
2. A binning grid is determined for the tile based on the resolution value of the tile.
    2.1 Each bin in the binning grid is set to have an "empty" status
3. The data points for the tile are loaded from storage and each point in the tile is processed.
4. The bin in which a data point is to be located is determined using the spatial position of the data point.
    4.1 If the bin status is "empty," it is changed to "not empty."
    4.2 The data point is added to a list of points for that bin.
5. The point is inserted into the mesh using a Delaunay Triangulation algorithm.
6. Representative finalization points associated with each bin with a status of "empty" are inserted into the mesh.
7. Steps 2 through 6 are repeated for the tiles that share a tile boundary with the intersecting tile for which the partition is being constructed.
    7.1 As an optimization, the points in boundary tiles that are considered for insertion into the mesh are limited to those that lie within a certain distance of the main tile.

With respect to the binning grid determined for each tile, the bins need not be rectangular, which includes squares (or cuboid in the case of a 3D mesh). Bins can be any desired shape, including hexagons or triangles, that contribute to forming a grid in which points can be located. It should be noted that the points located in a given bin can be anywhere in that bin.

In accordance with an exemplary embodiment, as a further optimization during step 4, the points can be "thinned" using a user-specified threshold resolution (the "thinning resolution"). Such a step removes points from a bin according to a given input criteria. Alternately, or in addition, a single point can be assigned to a bin, which point is chosen based on user criteria. For example, the point that best matches the criteria for that bin is assigned to the bin, and all other points associated with that bin are discarded. Numerous criteria for thinning operations may be applied, and may result in one or more points being ultimately assigned to a given bin. For example, the criteria may call for a group of points with a given spatial separation to be maintained in a bin. The point(s) assigned to a bin with a thinning operation may or may not depend on which points are encountered first during processing. Also, while thinning operations are performed consistently for a given bin, the same or different thinning operations or thinning criteria can be applied to other bins. For example, the criteria for thinning the points may vary based on such factors as tile location or size, density of points, partition size or location, or any other factor that may be desirable to apply to reduce the number of points to process. With the thinning operation optimization, the mesh can contain fewer points, which may be of use in certain applications that do not require all of the data be present to obtain satisfactory results.

Moreover, the finalization point associated with an empty bin in a tile can be located anywhere within the bin. For example, a consistent scheme can be used to locate finalization points in the center of each empty bin. Alternately, or in addition, finalization points can be defined at specific locations in each bin, which locations may vary depending on various criteria, such as nearness to a tile or partition edge, or as part of a function for placing finalization points. In any event, the placement of a finalization point in a bin is not limited to any specific location in the bin.

According to an exemplary embodiment, the quadtree query based on the user-defined User Area is modified to return intermediate parent tiles rather than leaf tiles if the leaf tile resolution is greater than the thinning resolution. Then, if more than one point is found to lie in one bin in a binning grid for a tile, a single point is selected for insertion into the mesh. Any technique for selecting an insertion point can be used provided that the selection is deterministic given the list of all points that fall into the bin. According to an exemplary embodiment, the point in the bin with the smallest value in a single attribute is selected for insertion into the mesh.

Once a mesh partition has been constructed, the following post-processing steps can be applied.

1. Triangles that have a finalization point as a vertex are removed from the mesh. Removing these triangles allows the mesh to model areas in the point cloud where there is no valid data, effectively creating "holes" in the mesh. Note that the continuity condition is valid until these triangles have been removed.
2. The triangles that do not "belong" to the partition are removed. "Belonging" can be established using any deterministic method that uniquely assigns a specific triangle to a specific partition.

When the triangles that do not belong to a given partition are removed, the resulting partition mesh generally has jagged edges due to the mesh border of the partition being defined by the triangle edges remaining. However, the jagged edges of the mesh partition exactly match the edge of a neighboring mesh partition, so that when partitions are joined, the edges "zipper" together for an exact fit. Accordingly, the union of partition meshes forms a mesh that has no overlap or gaps, in the case where data points are present for those border triangles, or in the case where finalization points and the resulting triangles are used. The union of partition meshes where triangles resulting from finalization points are removed may not be continuous, or may have gaps, however, any triangles that exist along a common border of adjoining partitions will match exactly with each other, e.g., without overlap or gaps.

According to an exemplary embodiment, triangles are considered to "belong" to a partition when their lower-left vertex lies within the tile for which that partition is constructed. The identification of the lower-left vertex can be deterministically obtained based on order of operations, such as by consistently evaluating which vertex is lowest, and if more than one, followed by which vertex of those lowest is leftmost.

With respect to establishing the border of a mesh partition, the insertion of finalization points limits the size of the circumcircles in the mesh to a fixed multiple of the resolution. As a result, once all of the points within the insertion tile and its neighbors and the corresponding finalization points (if any) have been inserted into the mesh, no new points will appear that will intersect any of the circumcircles in the mesh. The mesh is therefore stable.

Figure 5:
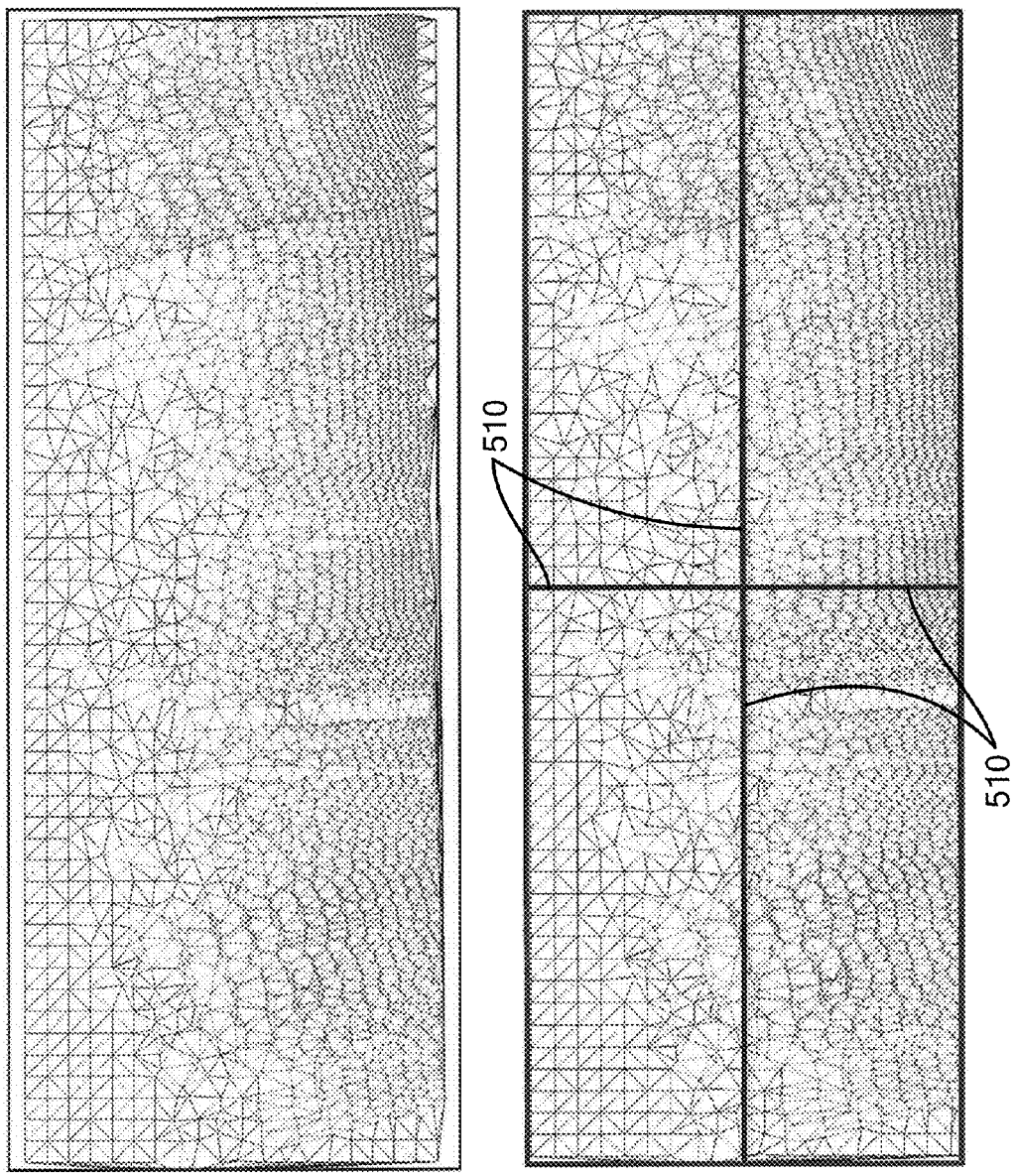
FIG. 5 is an illustration of mesh partitioning in accordance with an exemplary embodiment of the present disclosure.

Referring to FIG. 5, a fully constructed mesh is shown as a single mesh, and as a union of four separate meshes. The regular triangles in the mesh, such as are located near the top border of the single mesh, represent triangulations generated with finalization points. Accordingly, the mesh is continuous, and the mesh partitions can be joined to form continuous meshes. Each of the triangles that are on or cross a partition border 510, which can represent one or more tile borders, are determined to belong to one partition or the other. Some triangles may have vertices that are located across a border. However, as long as the determination of how a triangle should be placed in one partition or another is consistently applied, each partition will have an edge composed of triangles that exactly matches that of a neighboring partition.

Figure 6:
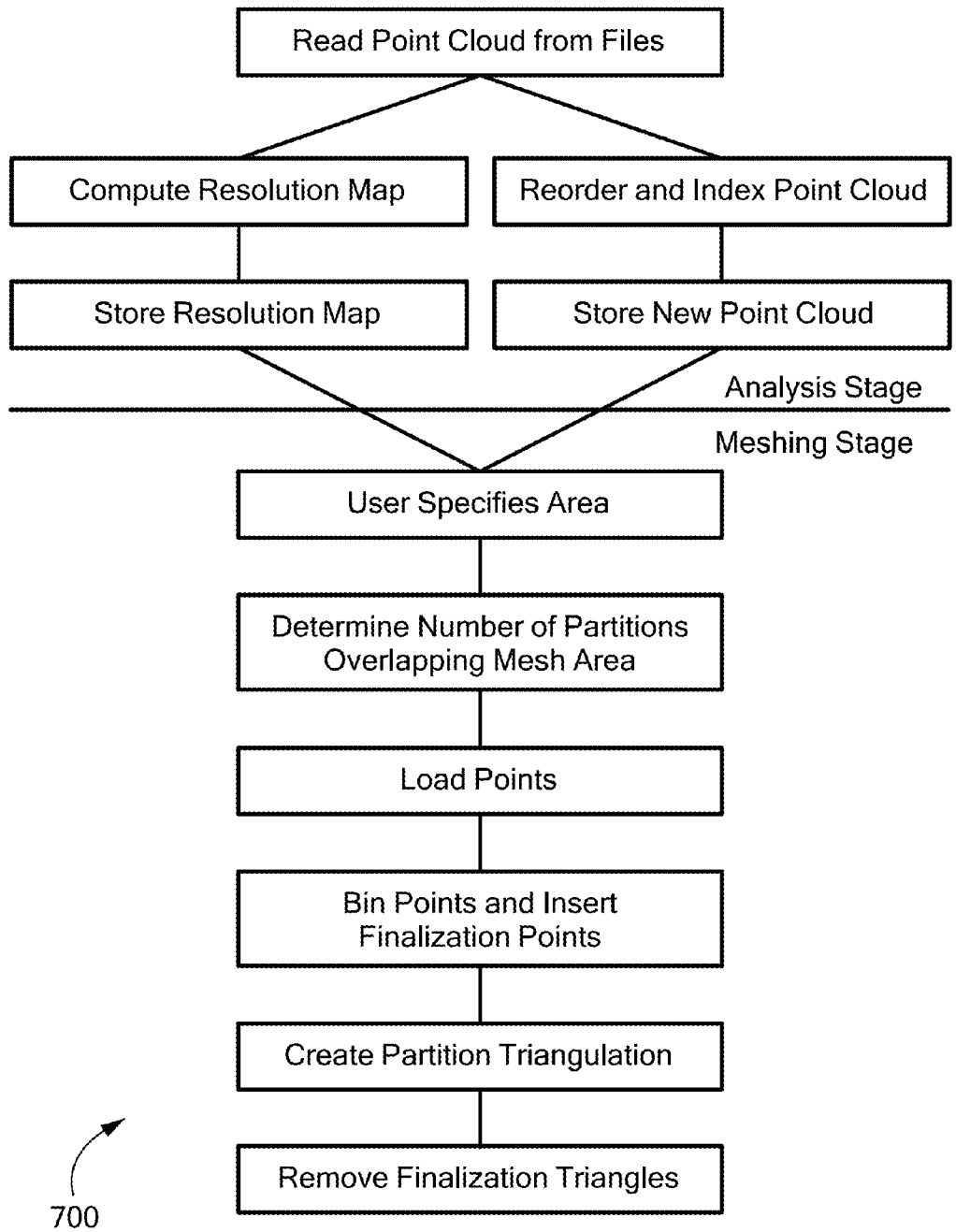
FIG. 6 is a flow chart illustrating a process in accordance with an exemplary embodiment of the present disclosure.

Referring to FIG. 6, a flowchart 700 illustrates the steps of the analysis stage and meshing stage described above. As illustrated in flowchart 700, the computation and storage of the resolution map can be implemented separately and in parallel with the reordering, indexing and storage of the point cloud. That is, the resolution map can be computed from the original point cloud files, or from the reordered and indexed stored point cloud. Also, the analysis stage and meshing stage are discrete, indicating that once a resolution map is generated, and the point cloud is reordered and/or indexed and stored, a meshing operation can be conducted at any time. Moreover, if more points are added to the point cloud, the resolution map can be recalculated and the modified point cloud can be reordered and/or indexed for storage to account for the new points, without impacting how the meshing stage is implemented. This flexibility in design represents a significant advantage over mesh generation systems that require all the data points in the point cloud to be held in memory to generate the mesh.

The resolution and the associated binning grid can be thought of as an a priori model of the distribution of points in each tile. The insertion of finalization points limits the size of the circumcircles in the mesh to a fixed multiple of the resolution. As a result, once all of the valid points within a fixed window around any area and the corresponding finalization points (if any) have been inserted into the mesh for a partition, no new points will appear that will intersect any of the circumcircles in the partition mesh indicating that the so constructed partition mesh is stable. For example, if a user specifies a resolution of two meters for the resolution map, upon forming the mesh partition, points that are greater than two meters from the edge of the partition will not interact with the points in the partition during triangulation.

Because Delaunay Triangulations are unique and deterministic and the placement of the finalization points is deterministic, the triangulation of the partitions as well as the entire mesh is unique and deterministic. Provided that each triangle can be deterministically assigned to one and only one partition, the union of the partitions will therefore be equivalent to a triangulation of the entire mesh.

The systems and methods of the present disclosure provide a number of advantages. For example, the algorithm can be used to generate a mesh over very large collections (e.g. billions) of regular and/or irregular points by generating mesh partitions. Mesh partitions can be generated in parallel, and can be joined to obtain a larger continuous mesh. Accordingly, the computation of a mesh can readily be distributed across computers or networks, the results of which can be combined to obtain a larger mesh as a union of partition meshes.

In addition, operations such as contour algorithms, performed on a mesh partition, can be distributed and collected based on mesh partitions to obtain a proper result for a larger mesh, without having to perform the operation on the larger mesh. Thus, the mesh partitions can exhibit linearity. Also, the mesh partitions intersect at the partition boundaries. The resolution value effectively produces meshes that can have edges that are limited in length. In addition, the resolution can be adjusted dynamically to model different density conditions. The resolution can also be specific to a tile, so that the mesh can have different, useful densities of points and/or resolutions.

The buffer around the User Area being meshed is relatively small. Its size can be computed explicitly in terms of the resolution values. It is the definition of this buffer area, in accordance with user-specified criteria, that stabilizes the mesh generation for the pertinent partitions. The points added to the mesh that fall outside the buffer, as determined by the user-specified criteria, do not impact the mesh already formed near the edge of the partition. This useful phenomena is an intentional result of insertion of finalization points and user-specified criteria for defining a border size (directly or indirectly), and permit a number of partition meshes to be generated that can be combined to represent larger portions of the overall mesh.

The meshing algorithm can work on any data set on which the resolutions in the resolution map can be computed. In some cases (e.g. a fixed-resolution raster), the resolutions are given explicitly by the data. In others, (e.g. a nested raster), they can easily be computed. A construction technique can be used to either compute the resolutions in the map, or specifically place the points in the mesh, or both.

The variable resolution mesh technique can produce a mesh at multiple levels of detail, making it well suited for multi-level visualization. This visualization technique allows users to view an overview of a large area at a very coarse level of detail, and then zoom in to a smaller area that is represented at a finer level of detail.

The resolution map can be computed using custom tools for construction in accordance with one or more parameters. For example, a construction tool is provided for generating the resolution map as a function of the density of points in each tile. The resolution map can also be computed using other attributes, such as, for example, the variance of the points in an area, their change in any one dimension, or any other attributes that can contribute to forming the resolution map. Furthermore, the choice of resolution values can influence the performance of the meshing algorithm in practice, which can be accommodated by the construction tools.

The variable resolution meshing algorithm has been described in the above document in the context of a 2D or 2.5D mesh (one in which the point positions are 2D coordinates in the horizontal plane). However, the disclosure is not to be viewed as limited to these examples, since the meshing algorithm can be used for points representing a space that has one or more arbitrary number of dimensions. For example, 3D meshes (in which the point positions are fully 3D) can be realized in which the resolution map quadtree and binning grid are extended to a third dimension, e.g. using an octree and 3D binning grid. Mesh generation techniques that use tetrahedralization techniques can be used to compute a 3D mesh once binning has been performed.

The operations depicted and/or described herein are purely exemplary and imply no particular order. Further, the operations can be used in any sequence when appropriate and can be partially used. With the above embodiments in mind, it should be understood that they can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations depicted and/or described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed systems and methods can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this disclosure. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the disclosure.

What is claimed is:

1. A computer implemented method for generating a polygonal mesh based on a collection of points, comprising:
   generating, by a processor, a resolution map that includes a set of tiles, each tile having an associated resolution value representative of a density of the points located in the tile;
   defining a binning grid for each tile based on the associated resolution value of the tile;
   selecting one or more tiles for inclusion in a mesh partition for mesh generation;
   assigning each point associated with each selected tile to a bin in the binning grid of a respective tile;
   assigning a finalization point to each empty bin in the binning grid;
   generating, by the processor, the mesh partition using points assigned to the bins in the selected tiles;
   removing polygons from the mesh partition that include a finalization point at a vertex; and
   outputting the mesh partition.

2. The method according to claim 1, further comprising receiving a mesh area input for generating the polygonal mesh.

3. The method according to claim 2, further comprising selecting all tiles that are at least partially within the mesh area input.

4. The method according to claim 3, further comprising generating each mesh partition that is at least partially within the mesh area input.

5. The method according to claim 4, further comprising generating each mesh partition using points located outside each respective mesh partition.

6. The method according to claim 5, wherein the points located outside each respective mesh partition are determined by the resolution value.

7. The method according to claim 1, wherein the resolution map is generated in accordance with one or more of a quadtree or an octree structure.

8. The method according to claim 1, wherein the mesh partition is one or more of a 2D or 3D mesh.

9. The method according to claim 1, further comprising generating the resolution map based on one or more of a characteristic of the collection of points or an attribute of the points.

10. The method according to claim 1, further comprising organizing and storing the collection of points in accordance with an associated spatial position of each point in the collection of points.

11. The method according to claim 1, further comprising:
    loading the resolution map into memory; and
    loading a subset of points from the collection of points into the memory, where the subset of points includes each point in the selected one or more tiles.

12. The method according to claim 1, wherein the resolution map is a hierarchical resolution map.

13. The method according to claim 1, further comprising combining the mesh partition with at least one additional independently triangulated mesh partition to generate a single, contiguous, non-self-intersecting mesh that covers an area represented by the collection of points.

14. A system for generating a polygonal mesh from a collection of points, comprising:
    a processor communicatively coupled to a memory and operative to execute instructions retrieved from the memory to:

generate a resolution map that includes a set of tiles, each tile having an associated resolution value representative of a density of the points located in the tile;

define a binning grid for each tile based on the associated resolution value of the tile;

select one or more tiles for inclusion in a mesh partition for mesh generation;

assign each point associated with each selected tile to a bin in the binning grid of a respective tile;

assign a finalization point to each empty bin in the binning grid;

generate the mesh partition using points assigned to the bins in the selected tiles; and removing polygons from the mesh partition that include a finalization point at a vertex.

15. The system according to claim 14, wherein the processor is further operative to receive a mesh area input for generating a mesh.

16. The system according to claim 15, wherein the processor is further operative to select all tiles that are at least partially within the mesh area input.

17. The system according to claim 16, wherein the processor is further operative to generate each mesh partition that is at least partially within the mesh area input.

18. The system according to claim 17, wherein the processor is further operative to generate each mesh partition using points located outside each respective mesh partition.

19. The system according to claim 14, wherein the processor is further operative to organize and store the collection of points in accordance with an associated spatial position of each point in the collection of points.

20. A computer implemented method for generating a mesh, comprising:

determining, by a processor, a mesh partition to be generated;

assigning a binning grid to at least one tile in the mesh partition;

assigning each point associated with the at least one tile to a bin in the binning grid;

assigning a finalization point to each empty bin in the binning grid;

generating, by the processor, the mesh using the points assigned to the bins in the binning grid; and removing polygons from the mesh partition that include a finalization point at a vertex.

21. The method according to claim 20, further comprising receiving a mesh area input for generating the polygonal mesh, wherein determining the mesh partition to be generated is based at least in part on the mesh area input.

* * * * *